United States Patent Office.

IMPROVED METHOD OF DEFECATING CANE JUICE.

LAWRENCE REID, OF NEW YORK, N. Y., AND DAVID LYMAN, OF MIDDLEFIELD, CONNECTICUT, ADMINISTRATOR OF THE ESTATE OF EDWARD H. SWIFT, DECEASED, ASSIGNORS TO PHINEAS L. ROBINSON AND JOSEPH H. PARSONS.

Letters Patent No. 60,246, dated December 4, 1866; antedated November 29, 1866.

SPECIFICATION.

TO ALL WHOM IT MAY CONCERN:

Be it known that we, LAWRENCE REID, of New York city, in the county and State of New York, and DAVID LYMAN, of Middlefield, in the county of Middlesex, in the State of Connecticut, administrator on the estate of EDWARD H. SWIFT, deceased, do hereby declare that the said REID and the said SWIFT were joint inventors of certain new and useful improvements in Defecating Sugar Cane Juice with the use of sulphurous acid and alcohol; and we do hereby declare that the following is a full and exact description thereof.

This invention relates to the employment of sulphurous-acid gas in connection with alcohol, so as to remove the impurities with little danger of injuring the juice.

We will now proceed to describe what we consider the best method of operating with the sulphurous acid and alcohol, and the proper accompanying materials to make the cold defecation, copying liberally from a description prepared during the lifetime and with the approval of Mr. SWIFT.

Our sulphurous defecation, cold and hot, requires the use of a combination of that acid with alcohol, alcohol being capable of absorbing many times its own volume of sulphurous-acid gas. We agitate that gas in contact with the ordinary alcohol of commerce in a closed vessel until we have obtained a saturated solution or compound. In the cold defecation we prefer, for a tank containing seven hundred gallons of cane juice, to add from two to six pounds of the sulphurous acid and alcohol compound, and then at a proper time neutralize the whole with a mixture of slaked lime and water. We then allow the liquor to settle or filter, or both; the clear liquor is then run into boilers, and is fit for use; or, when in the boilers, it may be further neutralized with our slightly alkaline phosphate of lime. The mode of preparation of this latter material by lime and superphosphate of lime, so as to be peculiarly adapted for this use, is described in detail in a patent granted to us of even date herewith. Where it is advantageous on account of the rapid decomposition of the cane juice, the sulphurous acid compound may remain in combination without being neutralized with lime, and only neutralized at the time the cane juice is ready to be operated on. In the hot defecation we prefer to use the sulphurous acid compound immediately before placing the cane juice in the boiler, or add the compound before the juice has got heated up in the boiler, and then neutralize with slaked lime and water, using the same quantities as in the cold defecation; and also preferring, finally, to use our slightly alkaline phosphate of lime for further neutralization, and to promote crystallization. In case a single application of the sulphurous acid and alcohol compound, when neutralized by lime and water, is not sufficient to effect a complete defecation, additional amounts of this compound and of the lime and water may be alternately added until the defecation is completed. In this process, from the alternate application of the acid compound and lime, we believe that we avoid the injury the sugar is liable to sustain from the action of either acids or alkaline substances in excess; and as the reaction of the lime upon the sulphurous acid immediately produces a neutral salt, we insist that we are defecating with a nearly neutral body that has the advantage of being slightly acid and alkaline alternately, and causing a very complete defecation of the juice. We propose to use under some circumstances, on account of the varying nature of cane juice, in addition to the sulphurous acid and alcohol compound, some one or more of the slightly acid bodies set forth as defecators in patents issued to us bearing even date herewith; but we do not believe such combination of processes to be generally expedient. When such are used the quantity of sulphurous acid and alcohol may be correspondingly diminished. The varying nature of cane juice at different periods, and particularly on different estates, renders it desirable to vary the proportions of the materials considerably, which will be determined by the practical sugar boiler. We obtain, as a general result, the production of from fifteen to thirty per cent. more sugar, and of a better quality than usual, and the saving to the estates of the cost and trouble in the use of bone-black, and, where vacuum pans are employed, producing a sugar equal to that produced by bone-black.

Having now fully described our invention, what we claim as new, and as the invention of the said LAWRENCE REID and EDWARD H. SWIFT, deceased, and desire to secure by Letters Patent, is as follows:

We claim, in the defecation of sugar-cane juice, the use of the compound of alcohol and sulphurous acid, prepared by impregnating alcohol with sulphurous acid gas, in the manner and for the purposes herein set forth.

We also claim the combination with the compound of alcohol and sulphurous acid in the above described process of one or more of the other defecating agents, set forth in patents issued to us of even date herewith.

LAWRENCE REID,
DAVID LYMAN.

Witnesses:
D. L. FREEBORN,
D. W. STETSON, } To L. R.
H. WOODWARD,
LYMAN A. MILLS, } To D. L.